United States Patent
Miller

[11] 3,790,902
[45] Feb. 5, 1974

[54] FUNDAMENTAL TRANSVERSE MODE OPERATION IN SOLID STATE LASERS

[75] Inventor: Stewart Edward Miller, Locust, N.J.

[73] Assignee: Bell Telephone Laboratories, Incorporated, Murray Hill, N.J.

[22] Filed: Sept. 5, 1972

[21] Appl. No.: 286,282

[52] U.S. Cl.. 331/94.5 C, 331/94.5 H, 350/96 WG, 317/235 R
[51] Int. Cl. ............................................... G02f 3/00
[58] Field of Search............ 331/94.5 C, 94.5 H; 350/96 WG

[56] References Cited
UNITED STATES PATENTS
3,395,366  7/1968  Snitzer et al. ...................... 331/94.5

OTHER PUBLICATIONS
Ripper et al.: "Stripe Geometry Double Heterostructure Lasers," Applied Physics Letters, Vol. 18, pp. 155–157, Feb. 15, 1971.

Morcatelli: "Dielectric Rectangular Waveguide," Bell Systems Technical Journal, Vol. 48, pp. 2071–2102, Sept. 1969.

*Primary Examiner*—Edward S. Bauer
*Attorney, Agent, or Firm*—M. J. Urbano

[57] ABSTRACT

Fundamental transverse mode operation is achieved in a monolithic laser structure comprising an intracavity passive waveguide portion, which is capable of supporting only the fundamental transverse mode, arranged in tandem with the laser active medium, which typically would oscillate in a plurality of transverse modes. Particular embodiments are described for double heterostructure junction lasers.

10 Claims, 2 Drawing Figures

PATENTED FEB 5 1974

3,790,902

3,790,902

FUNDAMENTAL TRANSVERSE MODE OPERATION IN SOLID STATE LASERS

BACKGROUND OF THE INVENTION

This invention relates to solid state lasers and, more particularly, to arrangements for attaining fundamental transverse mode operation in such lasers.

It is well known in the laser art that for each longitudinal (axial) mode at which a laser operates there are, in general, a plurality of associated transverse modes. In some applications, however, it is desirable that the laser oscillate in only the fundamental or zero-order transverse mode. For example, in an optical communications system the fundamental mode facilitates optical coupling between various components of the system (e.g., efficient matching into single-mode fibers for dispersion-free propagation). On the other hand, where high power densities are desirable, such as in a laser machining or micrographics system, the fundamental mode is most suitable because its energy distribution is concentrated on the optic axis of the laser resonator.

One type of laser particularly suited to these applications is the double heterostructure ($DH$) junction laser which has been made to operate on a continuous wave basis at room temperature. For low power, c.w. applications the active region of the DH laser is sufficiently narrow ($\lambda/2$ to 1.0 $\mu$m) that only the fundamental transverse mode perpendicular to the junction plane oscillates. Restriction of the oscillation to the fundamental mode parallel to the junction plane is commonly achieved by means of a stripe contact geometry. However, where higher power pulsed outputs are desired, catastrophic mirror damage considerations dictate the use of thicker active regions (e.g., 2 to 4 $\mu$m). Unfortunately, such thicker active regions permit higher order transverse modes perpendicular to the junction plane to oscillate.

SUMMARY OF THE INVENTION

In accordance with an illustrative embodiment of my invention, fundamental transverse mode operation is achieved in a monolithic laser structure comprising an intracavity passive waveguide portion disposed in tandem and contiguous with the active medium of a solid state laser. Whereas the active medium in general might generate radiation in a plurality of transverse modes, the dimensions (cross-section and length) and refractive index of the passive portion are mutually adapted to support the fundamental transverse mode only. Reflections at the interface between the active medium and the passive portion are reduced by either of two illustrative techniques (1) by making the refractive index of the active medium and the passive portion as nearly equal as possible or (2) by forming between the two a quarter wavelength impedance matching layer.

In an illustrative embodiment, the active medium comprises a stripe geometry p-n junction semiconductor body of the double heterostructure type and the passive portion comprises a dielectric body of length L2 having therein an elongated rectangular waveguide axially aligned with the active region of the DH body. The dimensions and refractive index of the waveguide are mutually adapted to support only the fundamental transverse mode perpendicular and parallel to the junction plane. Adequate spreading, and hence attenuation, of higher order modes is assured by satisfying the inequality $$L2 \geq 2w^2/\lambda n_2, \quad (1)$$

where $w$ is the width of the higher order mode field in the active medium (i.e., approximately the stripe width $S$ in the junction laser case), $\lambda$ is the free space operating wavelength of the laser radiation and $n_2$ is the index of refraction of the passive portion surrounding the waveguide. This configuration advantageously permits the use of wider stripes, thicker active regions and hence higher power densities and yet maintains fundamental transverse mode operation.

BRIEF DESCRIPTION OF THE DRAWING

My invention together with its various features and advantages can be easily understood from the following more detailed description taken in conjunction with the accompanying drawing, in which.

DETAILED DESCRIPTION

Figure 1:
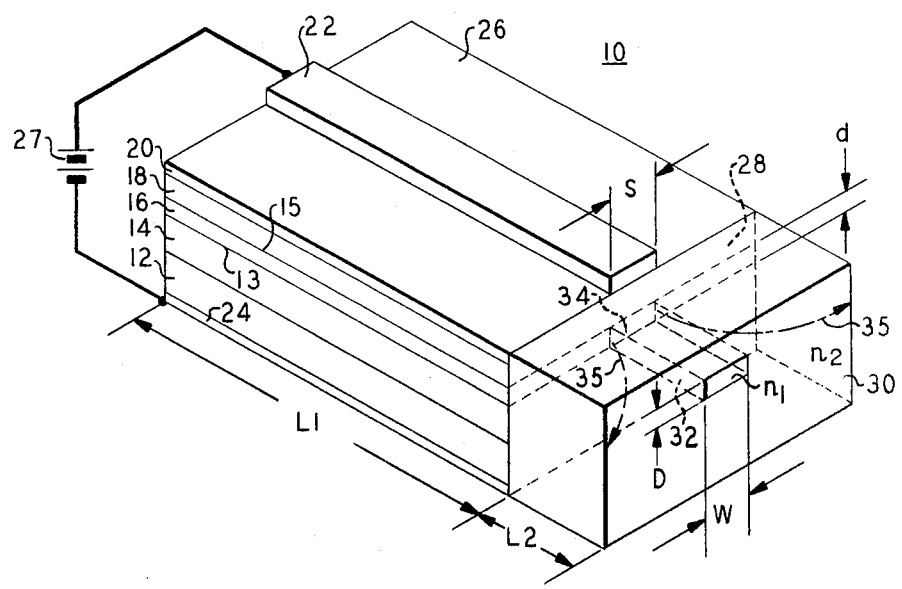
FIG. 1 is a schematic of an illustrative embodiment of my invention in which a waveguide of refractive index $n_1$ is surrounded by a region of uniformly lower refractive index $n_2$.

Turning now to FIG. 1, there is shown a fundamental transverse mode junction laser 10 in accordance with an illustrative embodiment of my invention. The laser 10 comprises a double heterostructure (DH) portion of length L1 arranged in tandem and contiguous with a passive portion of length L2.

As is now well known in the art, the DH portion typically comprises an $n-GaAs$ substrate 12 on which are grown the following epitaxial layers in the order recited:

an $n-Al_xGa_{1-x}As$ layer 14, $x > O$; an $n-$ or $p-$ or compensated $Al_yGa_{1-y}As$ layer 16, $0 \leq y < x$; and a $p-Al_zGa_{1-z}As$ layer 18, $z > y$. The interfaces between layer 16 and layers 14 and 18 form a pair of heterojunctions 13 and 15, respectively, which define an active region of thickness $d$, i.e., that region where low threshold radiative recombination of holes and electrons occurs when the DH portion is forward biased. The width of the active region measured parallel to the junction plane is limited by a stripe geometry metal contact 22 of width S and length L1 which typically extends between cleaved parallel surfaces 26 and 28 of the DH portion. Surface 26 may be made partially transmissive to form an output face whereas surface 28 is made contiguous with the passive portion to be described hereinafter. The stripe geometry contact may be fabricated by well known oxide masking techniques or by a proton bombardment technique described in copending application Ser. No. 204,222 (D'Asaro Case 10–4–6–3) filed on Dec. 2, 1971 and assigned to the assignee hereof.

In order to facilitate making good electrical contact to the topside of the DH portion, a $p-GaAs$ layer 20 is interposed between layer 18 and stripe contact 22.

Contact to the bottom side is made through a metal contact 24 formed directly on substrate 12. Forward bias is illustratively provided by means of a battery 27 connected between contacts 22 and 24.

As mentioned above, a passive portion of length L2 is disposed in tandem with the DH portion and contiguous with surface 28 thereof. The two portions form a monolithic structure in which the end surface 30 of the passive portion is disposed parallel to end surfaces 26 and 28. Surface 30 is typically made highly reflecting to form an optical cavity resonator with surface 26. To this end, surface 30 may optionally be provided with a well known reflecting coating (not shown).

With the cavity resonator thus defined, it is clear that both the DH portion and the passive portion are intracavity components. Importantly, the passive portion is provided with an elongated core 32 having a refractive index $n_1$ greater than the refractive index $n_2$ of the remainder of the passive portion surrounding the core 32. Preferably, the cross-sectional shape of the core 32 is substantially congruent with the cross-sectional shape of the active region of the active medium. That is, in the case of the stripe geometry DH laser active medium shown in FIG. 1, the active region 34 is substantially a rectangular parallelepiped of cross-sectional dimensions $S \times d$ and of length $L1$. Accordingly, the core 32 is also a rectangular parallelepiped but of cross-sectional dimensions $W \times D$ and of length $L2$. In general, because of the difference in the indicies of refraction and in the single-mode requirements of the passive portion, the dimensions $W \times D$ of the core 32 need not be identical to the corresponding dimensions $S \times d$ of the active region.

In operation, a higher order mode which might propagate in the active region 34 spreads upon entering the passive portion (as shown by lines 35) and on reflection from the output face 30 returns greatly enlarged in cross section, thereby introducing appreciable loss in the resonant cavity for that mode. Adequate spreading of the higher order modes is assured by making the length L2 of the portion satisfy the inequality $$L2 \geq 2S^2/\lambda n_2) \tag{2}$$

which is the same as inequality (1) with the stripe width S substituted for w, the width of the higher order mode field in the active region. The fundamental transverse mode, on the other hand, is guided in both the active region 34 and in core 32 and is reflected efficiently back into the active region. The core will sustain the fundamental transverse mode if $$\Delta \approx \tfrac{3}{4} (2\lambda/D)^2 \tag{3}$$

where $$\Delta = 1 - n_2/n_1) \tag{4}$$

and $$(2\lambda/Dn_1) \ll 1. \tag{5}$$

At surface 28 there may be a reflection due to the difference between the refractive index of the active region 34 and indices $n_1$, and $n_2$ of the passive portion. This would cause a reflection within the resonator. The resulting coupled cavities may have the beneficial effect of spreading the longitudinal modes for the desired mode of propagation, provided the lengths $L_1$ and $L_2$ are chosen properly. See, for example, an article entitled "Mode Selection in Lasers" by P. W. Smith in Proc. IEEE, 60, 422 (Apr. 1972). Alternatively, a layer may be interposed between the DH and passive portions to provide an approximate impedance match between the active region 34 and the core 32 using standard quarter-wave plate matching techniques.

Figure 2:
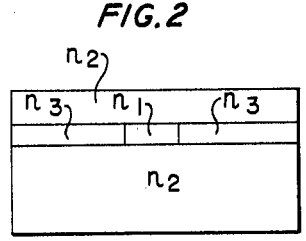
FIG. 2 is an end view of an alternative embodiment of my invention in which a waveguide of refractive index $n_1$ interfaces on its lateral sides with regions of lower refractive index $n_3$ and interfaces on its top and bottom sides with regions of lower refractive index $n_2$.

In practice, because of the asymmetry of the guided mode for the injection laser structure, it might be desirable to reduce the optical loss for radiation making the transition from the active to passive portion at surface 28 by using the index configurations shown in FIG. 2 for the passive portion. By having one index difference $n_1-n_2$ in the vertical direction and another index difference $n_1-n_3$ in the horizontal direction, the single-mode properties and mode shape properties of the passive portion can be more efficiently matched to the normal mode of the active region 34.

Illustratively, in the embodiment of FIG. 2, assume an injection laser with a stripe width of $S = 15\mu$m operating at $\lambda = 0.9\mu$m. The fundamental transverse mode of the active region 34 is expected to have a field variation given by $$E \sim \cos (\pi/2)(x/8.33) \tag{6}$$

where $x$ is the transverse distance measured in micrometers from the center of the stripe in a direction parallel to the junction plane. Using glass with a refractive index of 1.5 for the passive portion, this field shape can be matched quite well with an index difference $(n_1-n_2) \sim 1.5 \times 10^{-3}$ and a core width of $13\mu$m. The length $L2 = 2S^2/\lambda n_2$ calculates to be about $300\mu$m. A somewhat shorter passive portion may prove adequate if the surface 30 is made absorbing outside the region where the fundamental mode exists; this reduces the reflection for this higher order mode.

Alternatively, the passive portion may advantageously be made of GaAlAs with the core fabricated therein by well known photolithographic techniques, thereby avoiding any substantial refractive index difference at surface 28. Thus, in FIG. 1, the core would comprise $Al_pGa_{1-p}As$ and the surrounding passive portion would comprise $Al_qGa_{1-q}As$ with $0 \leq p < q$ so that $n_1 > n_2$. Of course, the aluminum content of the core (i.e., the fraction $p$) is chosen to reduce reflections at surface 28.

It is to be understood that the above-described arrangements are merely illustrative of the many possible specific embodiments which can be devised to represent application of the principles of my invention. Numerous and varied other arrangements can be devised in accordance with these principles by those skilled in the art without departing from the spirit and scope of the invention. In particular, although specifically described with reference to an injection laser, my invention is applicable more generally to any multimode active region joined to a single-mode passive region. Moreover, where desirable to reduce heat dissipation problems, the active medium may be provided with a suitable heat sink by means well known in the art.

There is being filed concurrently herewith a related application Ser. No. 286,283 in the name of B. W. Hakki (Case 9) entitled "Fundamental Mode, High Power Operation in Double Heterostructure Junction Lasers Utilizing a Remote Monolithic Mirror" and assigned to the assignee hereof.

What is claimed is:

1. In a solid state laser, a monolithic body comprising: an active medium capable of producing stimulated coherent radiation of free space wavelength $\lambda$ in a plurality of transverse modes when suitably pumped, said active medium having a first reflective face forming one mirror of an optical resonator for sustaining said radiation and having a second face, opposite said first face, through which said radiation is transmitted; a passive portion disposed contiguous with said second face and in the path of said radiation, said passive portion having a third face, opposite said first face, forming another mirror of said resonator, at least one of said first and third faces being partially transmissive to permit the egress of said radiation from said resonator, said passive portion including an elongated dielectric region therein having a refractive index higher than the refractive index $n_2$ of the remainder of said passive portion surrounding said dielectric region, said dielectric region having a cross-section perpendicular to the optic axis of said resonator which is substantially congruent with the shape of the cross-section of the active region of said active medium, the dimensions of the cross-section and refractive index of said dielectric region being adapted to support only fundamental transverse modes, and the length $L2$ of said dielectric region satisfying approximately the condition: $L2 \geq 2w^2/\lambda n_2$ where $w$ is the width of the higher order mode field in said active medium.

2. The body of claim 1 wherein said elongated dielectric region is a rectangular parallelepiped of width $D$ axially aligned with said active region along the optic axis of said resonator and said remainder of said passive portion has a substantially uniform spatial distribution of refractive index $n_1 > n_2$, said dielectric region satisfying the condition that $$\Delta \approx \tfrac{3}{4} (2\lambda/D)^2$$

where $$\Delta = 1 - n_2/n_1$$

and $$(2\lambda/Dn_1) << 1.$$

3. The body of claim 1 wherein said elongated dielectric region is a rectangular parallelepiped of width $D$ axially aligned with said active region along the optic axis of said resonator, and said remainder of said passive portion is defined by four zones, upper and lower spaced zones of refractive index $n_2 < n_1$ which are contiguous with a pair of oppositely facing side surfaces of said dielectric region and a pair of lateral spaced zones of refractive index $n_3 < n_1$ which are contiguous with the other pair of oppositely facing side surfaces of said dielectric region.

4. The body of claim 1 wherein the refractive indices of said dielectric region and of said active region are substantially equal.

5. The body of claim 1 including an impedance matching layer formed on said second face between and contiguous with said active medium and said passive portion.

6. The body of claim 1 wherein said active medium comprises a double heterostructure including a pair of heterojunctions defining therebetween said active region of thickness $d$ and a stripe geometry electrical contact of width $S$, said active region thereby being substantially a rectangular parallelepiped of cross-sectional dimensions: width $S$ and height $d$.

7. The body of claim 6 wherein said active medium and said passive portion comprise $AlGaAs$.

8. The body of claim 6 wherein said active medium comprises $AlGaAs$, said passive portion comprises glass and including an impedance matching layer between and contiguous with said active medium and said passive portion.

9. The body of claim 1 including means for pumping said active medium to generate said radiation.

10. In a solid state laser adapted for fundamental transverse mode operation, a monolithic body comprising:

a multilayered active medium including an epitaxial layer of $n-Al_xGa_{1-x}As$, at least one epitaxial layer of $Al_yGa_{1-y}As$, $0 \leq y < x$, thereby forming a first heterojunction at the interface therebetween, and an epitaxial layer of $p-Al_zGa_{1-z}As$, $z > y$, thereby forming a second heterojunction at the interface between said $Al_zGa_{1-z}As$ layer and said $Al_yGa_{1-y}As$ layer, said medium including a planar $p-n$ junction between said heterojunctions and having a pair of spaced parallel cleavage surfaces one of which forms one mirror of an optical resonator, a stripe geometry electrical contact of length $L2$ and of width $S$ formed on a major surface of said active medium and extending normal to said cleavage surfaces, thereby defining an active region in the shape of a rectangular parallelepiped of thickness $d$ equal to the total thickness of said at least one $Al_yGa_{1-y}As$ layer, of width $S$, and of length $L1$, a passive portion disposed contiguous with said second surface and having a third cleavage surface, parallel to said one mirror, forming another mirror of said resonator, at least one of said first and third surfaces being partially transmissive to radiation generated in said active region, said passive portion including a waveguide region in the shape of a rectangular parallelepiped axially aligned with said active region along the optic axis of said resonator, said waveguide region having length $L2$, height $D$, width $W$ and refractive index $n_1$, and the remainder of said passive portion having a refractive index $n_2 < n_1$, said waveguide region being designed so that $$\Delta \approx \tfrac{3}{4} (2\lambda/D)^2$$

where $\lambda$ is the free space wavelength of said radiation, $$\Delta = 1 - n_2/n_1$$

and $$(2\lambda/Dn_1) \ll 1,$$

thereby to support only fundamental transverse modes both parallel and perpendicular to the plane of said p–n junction and further being designed so that $$L2 \geq 2S^2/\lambda n_2$$

thereby to assure adequate spreading and hence attenuation of higher order modes, said waveguide region comprising $Al_pGa_{1-p}As$ and said remainder comprising $Al_qGa_{1-q}As$, $0 \leq p < q$, the parameters $p$ and $q$ being adapted to reduce reflections at said second surface.

* * * * *